(12) United States Patent
Mock et al.

(10) Patent No.: US 9,559,867 B2
(45) Date of Patent: Jan. 31, 2017

(54) CONTACT GROUP DYNAMICS IN NETWORKED COMMUNICATION DEVICES

(75) Inventors: Von Mock, Boynton Beach, FL (US); Juan C. Fernandez, Boca Raton, FL (US); Noel S. Massey, Carpentersville, IL (US); Guy G. Romano, Elmhurst, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1098 days.

(21) Appl. No.: 12/129,852

(22) Filed: May 30, 2008

(65) Prior Publication Data
US 2009/0300518 A1    Dec. 3, 2009

(51) Int. Cl.
| | |
|---|---|
| H04L 12/58 | (2006.01) |
| G06Q 10/10 | (2012.01) |
| H04N 7/173 | (2011.01) |
| H04N 21/414 | (2011.01) |
| H04N 21/4788 | (2011.01) |
| H04M 1/2745 | (2006.01) |

(Continued)

(52) U.S. Cl.
CPC .............. *H04L 12/581* (2013.01); *G06Q 10/10* (2013.01); *H04L 51/04* (2013.01); *H04L 67/02* (2013.01); *H04N 7/173* (2013.01); *H04N 21/41407* (2013.01); *H04N 21/4788* (2013.01); *H04L 67/306* (2013.01); *H04M 1/2745* (2013.01); *H04M 1/72566* (2013.01); *H04M 1/72572* (2013.01); *H04M 3/4931* (2013.01); *H04M 2203/655* (2013.01)

(58) Field of Classification Search
CPC ...................................................... G06F 3/048
USPC ............................................................ 715/753
See application file for complete search history.

(56) References Cited

U.S. PATENT DOCUMENTS

| | | |
|---|---|---|
| 6,519,771 B1 | 2/2003 | Zenith |
| 6,754,904 B1 | 6/2004 | Cooper et al. |

(Continued)

FOREIGN PATENT DOCUMENTS

| | | |
|---|---|---|
| EP | 1431896 A1 | 6/2004 |
| EP | 1431897 A1 | 6/2004 |

(Continued)

OTHER PUBLICATIONS

Patent Cooperation Treaty, "PCT Search Report and Written Opinion of the International Searching Authority" for International Application No. PCT/US2009/045423 Dec. 28, 2009, 11 pages.

(Continued)

*Primary Examiner* — David Choi
(74) *Attorney, Agent, or Firm* — Troutman Sanders LLP; James E. Schutz; Andrew C. Doherty (57) ABSTRACT

A communications terminal (200) including a user interface communicably coupled to a controller is configured to form a group of contacts. In one embodiment, the terminal displays only contacts having at least two attributes in common. In another embodiment, the terminal displays a group of contacts having a social relationship with at least two degrees of social separation relative to a user associated with the group. In another embodiment, a group of contacts is formed upon initiation of an application at the terminal, wherein all contacts in the group are associated with terminals running the same application and are also engaged in a common activity.

9 Claims, 6 Drawing Sheets

(51) Int. Cl.
*H04M 1/725* (2006.01)
*H04M 3/493* (2006.01)
*H04L 29/08* (2006.01)

(56) References Cited

U.S. PATENT DOCUMENTS

| | | | |
|---|---|---|---|
| 6,757,517 B2 | 6/2004 | Chang | |
| 7,433,344 B2 | 10/2008 | Lee et al. | |
| 7,819,749 B1* | 10/2010 | Fish | A63F 13/12 463/42 |
| 8,037,139 B1* | 10/2011 | Fish | A63F 13/12 709/204 |
| 2003/0101450 A1 | 5/2003 | Davidsson et al. | |
| 2003/0119540 A1 | 6/2003 | Mathis | |
| 2004/0015547 A1* | 1/2004 | Griffin | H04L 12/1827 709/204 |
| 2004/0148347 A1* | 7/2004 | Appelman | H04L 12/581 709/204 |
| 2004/0221224 A1* | 11/2004 | Blattner | H04L 12/1822 715/201 |
| 2005/0159970 A1 | 7/2005 | Buyukkokten et al. | |
| 2005/0172001 A1 | 8/2005 | Zaner et al. | |
| 2005/0286546 A1 | 12/2005 | Bassoli et al. | |
| 2006/0031772 A1 | 2/2006 | Valeski | |
| 2006/0098624 A1* | 5/2006 | Morgan | H04L 29/06027 370/352 |
| 2006/0135142 A1 | 6/2006 | Repka | |
| 2006/0174311 A1 | 8/2006 | Ducheneaut et al. | |
| 2006/0179160 A1 | 8/2006 | Uehara et al. | |
| 2006/0218153 A1 | 9/2006 | Voon et al. | |
| 2006/0233203 A1 | 10/2006 | Iwamura | |
| 2006/0242234 A1 | 10/2006 | Counts et al. | |
| 2006/0270395 A1 | 11/2006 | Dhawan et al. | |
| 2007/0106627 A1* | 5/2007 | Srivastava | G06Q 10/10 706/20 |
| 2007/0162862 A1 | 7/2007 | Ogasawara et al. | |
| 2007/0180078 A1* | 8/2007 | Murphy | H04L 63/123 709/223 |
| 2007/0197250 A1 | 8/2007 | Kies et al. | |
| 2007/0288627 A1 | 12/2007 | Abella et al. | |
| 2008/0010122 A1* | 1/2008 | Dunmire | G06Q 30/02 705/14.55 |
| 2008/0026694 A1* | 1/2008 | Ramanathan | H04N 5/44508 455/39 |
| 2008/0270229 A1* | 10/2008 | Manne | G06Q 30/02 705/14.49 |
| 2009/0037973 A1* | 2/2009 | Gustave | G06F 21/6263 726/1 |
| 2009/0172112 A1* | 7/2009 | Denner | H04L 12/581 709/206 |
| 2009/0187623 A1* | 7/2009 | Narayanaswami | G06Q 10/107 709/204 |
| 2009/0204601 A1* | 8/2009 | Grasset | G06F 17/30867 |
| 2009/0215486 A1* | 8/2009 | Batni | H04M 1/274583 455/550.1 |
| 2009/0300518 A1* | 12/2009 | Mock | G06Q 10/10 715/753 |

FOREIGN PATENT DOCUMENTS

| | | |
|---|---|---|
| EP | 1562132 A1 | 8/2005 |
| EP | 1587239 A1 | 10/2005 |
| KR | 1020050089258 | 9/2005 |
| KR | 10-2006-0121470 A | 11/2006 |
| KR | 10-0661743 B1 | 12/2006 |
| WO | 03/094012 A1 | 11/2003 |
| WO | 2004027559 A2 | 4/2004 |

OTHER PUBLICATIONS

EP11157944.7 Extended European Search Report, Mailed Apr. 2, 2014.
CN200980119590.7 Chinese Notification of Third Office Action, Mailed Jun. 17, 2014.

* cited by examiner

CONTACT GROUP DYNAMICS IN NETWORKED COMMUNICATION DEVICES

FIELD OF THE DISCLOSURE

The present disclosure relates generally to contact groups in communications devices and more particularly to the dynamic formation and management of user groups, for example, social contact groups, in communication devices and corresponding methods.

BACKGROUND

The formation of buddy lists based on presence is known generally. U.S. Publication 2007/0288627 entitled "Method for Sensing User Presence For Buddy List Applications" (Abella), for example, discloses a Internet Protocol television (IPTV) client device that provides a buddy list having icons indicating the status of various different types of presence associated with each buddy on the list. In the architecture of Abella, each client device senses the various different types of presence associated with the user and reports this presence information to a server. The server sends buddy list presence status information to other client devices. The various types of presence for which status information is provided in Abella include television presence, telephone presence, physical presence, and presence of shared content. In Abella, the client device updates the status of each buddy on the list based on updated status information provided by the server.

The various aspects, features and advantages of the disclosure will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

The disclosure is generally directed to communication terminals that generate and display one or more groups of contacts. In one embodiment, the contacts in the group changed or modified dynamically. The criteria for generating and modifying the groups are discussed more fully below. In one embodiment, the contacts in the group are representative of other users, for example, social contacts. Alternatively, the contacts in the group are representative of other devices, including but not limited to, client devices, servers, set-top-boxes, voice mail boxes or systems, wireless or wire-line subscriber devices, among other communication devices or terminals.

Figure 1:
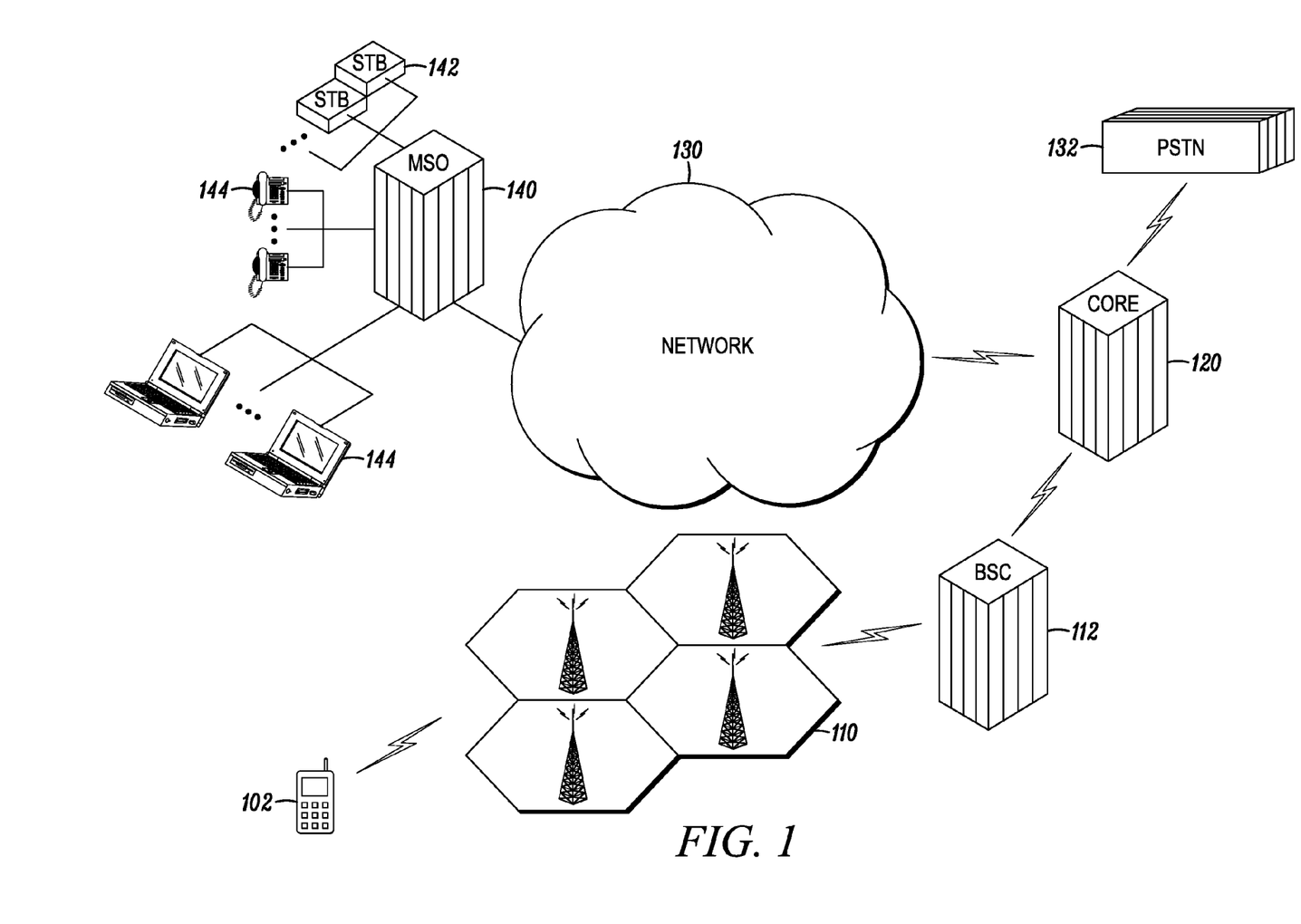
FIG. 1 illustrates a system of wireless communication networks.

Generally the communication terminals on which the groups of contact are generated and displayed are capable of communicating with one another, either directly or indirectly. The system 100 of FIG. 1 comprises one or more interconnected networks over which multiple communication terminals communicate. The system includes a wireless communication network comprising a radio access network (RAN) having a plurality of base stations 110, communicable coupled to controller entity 112, that provide communication services to users, for example, mobile station 102, in corresponding service areas or cells. The RAN is communicably coupled to a core network 120 that interconnects, via gateways or switches, the RAN to other networks, for example, to the Internet 130 and a Public Switch Telephone Network (PSTN) 132. The wireless communication network may be compliant with GSM, UMTS, CDMA, WiMAX or a later generation communication protocol communication network. FIG. 1 also illustrates a multi-system operator (MSO) that provides digital wideband communication services to subscribers over a cable or digital subscriber line (DSL). Such services include the delivery of programming and content to set-top-box (STB) subscribers 142, the provision of Internet Protocol (IP) based voice communication services to voice subscribers 144, and the provision of high speed Internet services to broadband Internet service subscribers. More generally, the communication infrastructure may be in the form of any local area network (LAN) or wide area network (WAN) operating pursuant to any communication protocol. The communication infrastructure may also be in the form of an adhoc network. Such ad hoc networks may be established using Bluetooth, 802.11x among other communication protocols. The communication networks in FIG. 1 are only exemplary and not intended to limit in any way the infrastructure over, or the mode by, which the communication terminals of the instant disclosure communicate.

Figure 2:
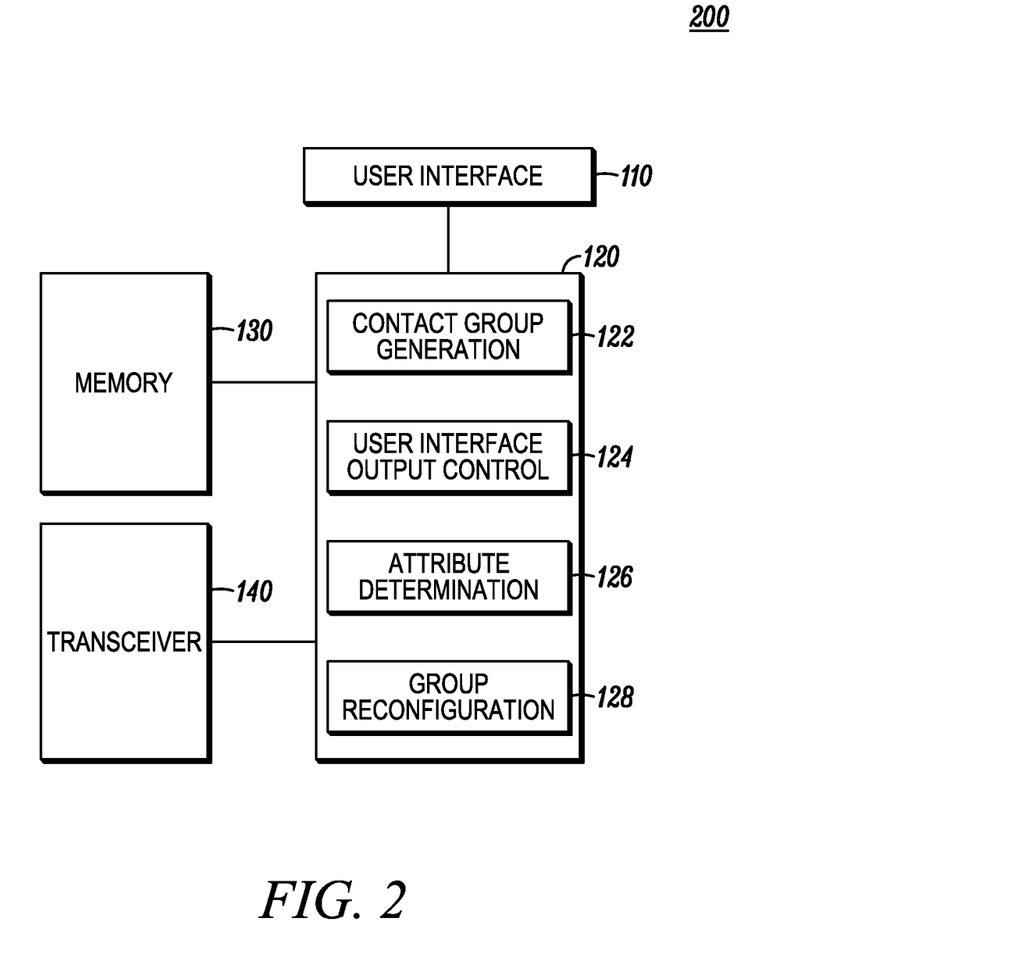
FIG. 2 is a communication terminal.

In FIG. 2, the communication terminal 200 comprises a user interface 110 communicably coupled to a controller 120. The user interface may include a visual display device, a keypad or keyboard and/or other input devices, like a microphone, an audio output among other inputs and outputs. In some implementations, the user interface is an integral part of the communication terminal. In another embodiment, the user interface of the communication terminal is a peripheral device to the terminal is connected, for example, by a wired or wireless link. In this disclosure, a peripheral user interface is considered a user interface of the communication terminal. The controller is coupled to memory 130 for storing, among other information, software and/or firmware that is executable by the controller, which may be efficiently implemented as a digitally programmable processor. Alternatively, the controller may be implemented as a hardware equivalent or as a combination of hardware and software. The functionality of the controller as it relates to the present disclosure is discussed more fully below. In some embodiments, the communication terminal also includes a transceiver 140, which may be in the form of a wireless or a wire-line transceiver device compliant with one or more communication protocols.

In one embodiment, the communication terminal generally has associated therewith one or more users that have associated therewith a group of contacts. According to this implementation, multiple users of the same communication terminal may each have one or more corresponding groups of contacts associated therewith, wherein the may be configured to preclude users from accessing one another's contact group information. Alternatively, the group of contacts may be associated with the communication terminal per se rather than with a user of the terminal. As suggested above, the contacts may be representative of other users, for example, of social contacts, or of other devices non-limiting examples of which are discussed above.

In one embodiment, the controller is configured to form a group of contacts and to cause the user interface to display the group contacts. In FIG. 2, at 122, the controller includes contact group generation functionality 122 the enables the controller to generate contact groups. The generation of the group of contacts may be initiated by the user or by the occurrence of an event, for example, the running of an application. It may also be initiated based on a schedule, location, or a timer. The basis or criterion on which the group contacts are generated is discussed more fully below.

In some embodiments, the controller causes the user interface of the terminal to display the group contacts on a user interface that is an integral part of the terminal. In another embodiment, the controller causes the user interface to display the group contacts on a peripheral display of the terminal, for example, via a wireless connection. The display of the group contacts on a peripheral display corresponds to displaying the group contacts on the user interface of the terminal, since the peripheral user interface is considered to be a user interface of the terminal when the terminal is coupled thereto. Presence may also be an attribute. In FIG. 2, the controller also includes a user interface output control functionality 124 that causes the user interface to display a group of contacts. This functionality also causes peripheral user interface devices to display the group of contacts if the terminal is coupled to a peripheral user interface. More generally, however, the controller does not necessarily always cause the user interface to display the group of contacts. In other embodiments, for example, this information could be communicated via an audio output. And in still other embodiments, it may be unnecessary to communicate this information.

In FIG. 2, the controller includes attribute determination functionality 126 for determining attributes of contacts which form the basis of the group of contacts generated. The attribute determination functionality may be performed based on information received by the transceiver 140. For example, the communication terminal may obtain attribute information from a server, for example, a presence server or a proxy server, that obtains presence and other attribute information about a pool of contacts under consideration for the group of contacts being generated. The pool of contacts may be contacts of an existing contact list associated with a particular user. Alternatively, the communication terminal may obtain contact attribute information directly from the contacts under consideration for the current contact list. Thus the controller may generate the group of contacts based on the attributes of the contacts on the existing contact list.

In one implementation, the controller generates and displays only contacts that have at least two attributes in common, wherein all contact in the group possess at least the same two attributes. In embodiments where the contacts are social contacts, the controller may generate the group of contacts wherein at least some of the contacts in the group are selected from a pool of contacts that is part of an existing group of contacts previously established by or associated with the user of the terminal. Thus one attribute may be a previous social interaction. Another attribute may be the inclusion of the contact on the user's existing contact list. Another attribute may be a common interest of the contacts, for example, a communicated interest in a particular topic. Another attribute may be the performance of an activity or the execution of an application. For example, the contacts may be playing a particular game or running a particular productivity application. Another attribute may be that the contacts are consuming media, for example, listening to the same audio content or viewing the same video, or surfing the same URL. Thus it may be appreciated that not only TV broadcast within a network environment can be shared, but music, podcast, video, images and location information can also be shared. Other attributes for adding a contact to a group could be based on increased communications with the contact over time, for example, as measured on average over a period of time relative to a threshold. A contact could be removed from the group based on reduction in communications relative to a threshold. These attributes are not intended to be limiting.

Figure 3:
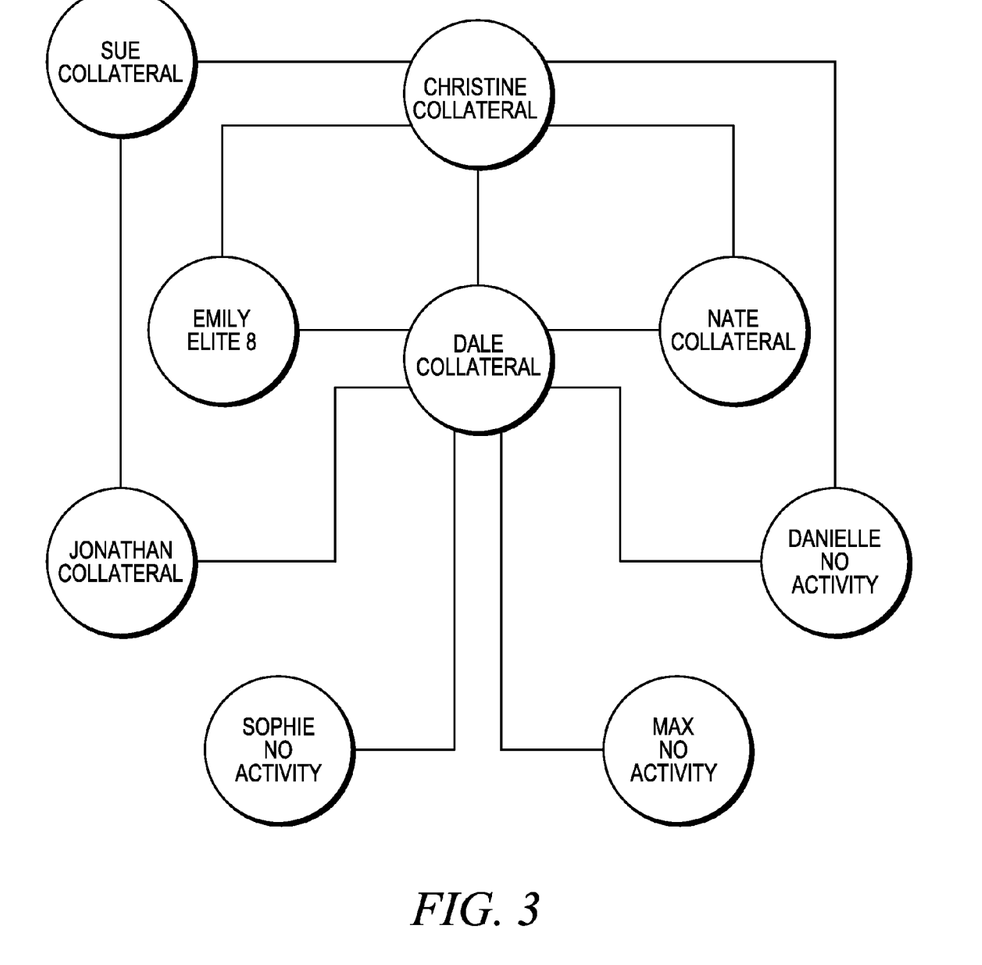
FIG. 3 illustrates a social network superset.
Figure 4:
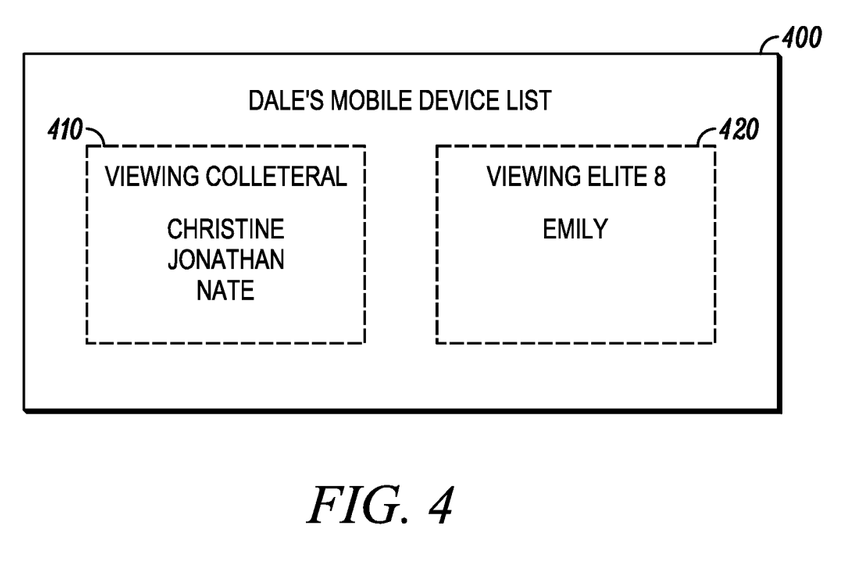
FIG. 4 illustrates a user display interface.

FIG. 3 illustrates a user Dale having an existing group of contacts that includes Christine, Nate, Danielle, Max, Sophi, Jonathan, and Emily. In one implementation, Dale generates and display a group of contacts from the exiting list of contact based on the user's viewing of the movie "Collateral". FIG. 4 illustrates a first group 410 of contacts including Christine, Jonathan and Nate, all of which have in common the consumption of the same content. Dale could also generate and display a second group of contacts based on the viewing of the movie "Elite 8". FIG. 4 illustrates only Emily in the second group 420 since only Emily is viewing the movie "Elite 8". All of the contacts in the first and second groups in FIG. 4 may also be considered to have a second attribute in common, namely their presence. All of the contacts in the first and second groups in FIG. 4 are commonly associated directly with Dale by a first degree of social interaction.

In one embodiment, the controller is configured to cause the user interface to display only contacts that have at least two attributes in a group on a dedicated portion of the user interface, wherein the dedicated portion is separate from other portions of the user interface on which other groups of contacts may be displayed. In FIG. 4, the first and second groups are displayed on dedicated portions 410 and 420 of the display. In FIG. 4, there is no intermingling of contacts in the first and second groups. All contacts in the first group 410 viewing the movie "Collateral" are co-located and all of the contacts in the second group 420 viewing the movie "Elite 8" are co-located. The visual separation of the groups may be performed by graphical boundaries or by some other mechanism.

In some embodiments, the controller is configured to change a number of contacts displayed on the user interface. In FIG. 2, the controller includes group reconfiguration functionality for this purpose. For example, the controller configured to remove one or more contacts from the group of contacts displayed on the user interface if or when the any of the contacts in the group no longer satisfies the criteria required of the displayed group. Similarly, the controller is configured to add one or more contacts to the group if or when a contact from the pool of contacts satisfies the criteria required to become a member of the group. In FIG. 3 for example, if Nate discontinued viewing the movie "Collateral", Nate could be removed from the first group of contacts 410 in FIG. 4. Similarly, if one of the other parties, like Sophie, Max Danielle, or Emily, was to begin viewing the mover Collateral, they could be added to the group.

Figure 5:
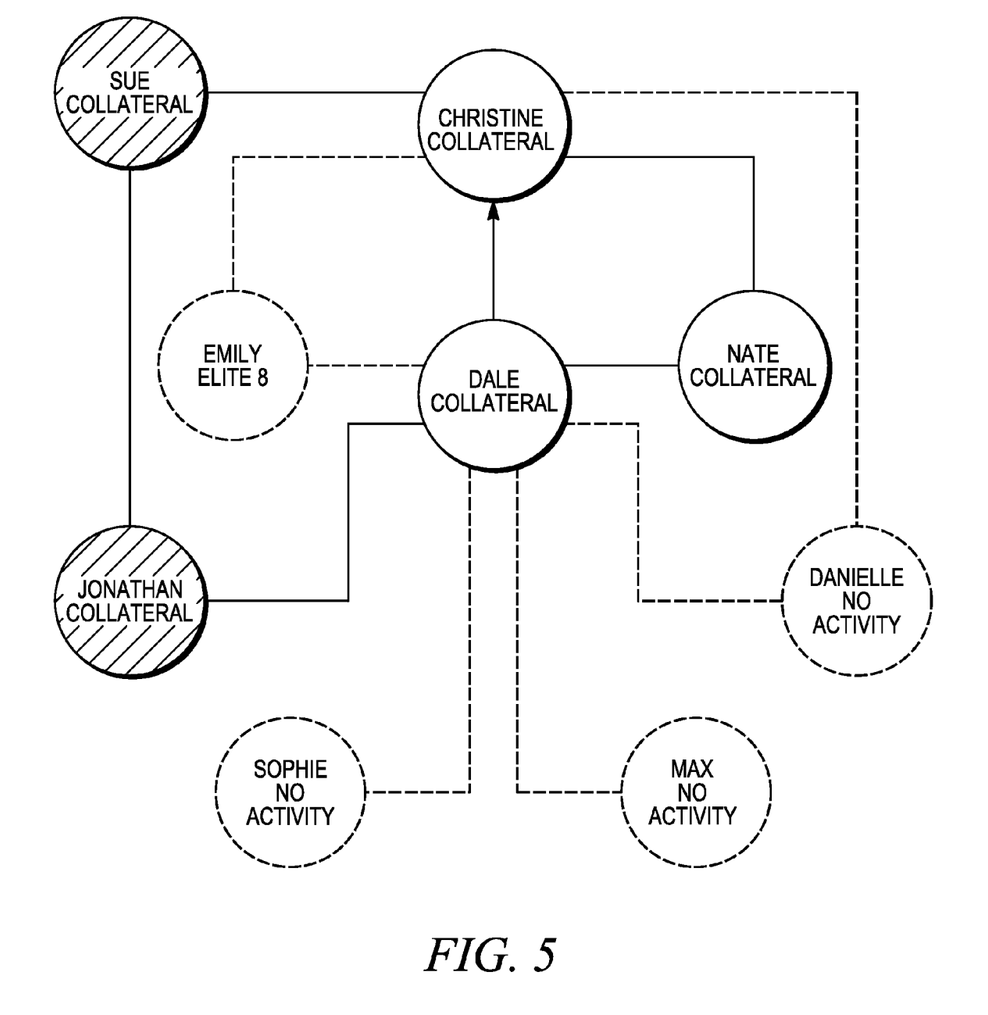
FIG. 5 illustrates a group of social contacts within a superset.
Figure 6:
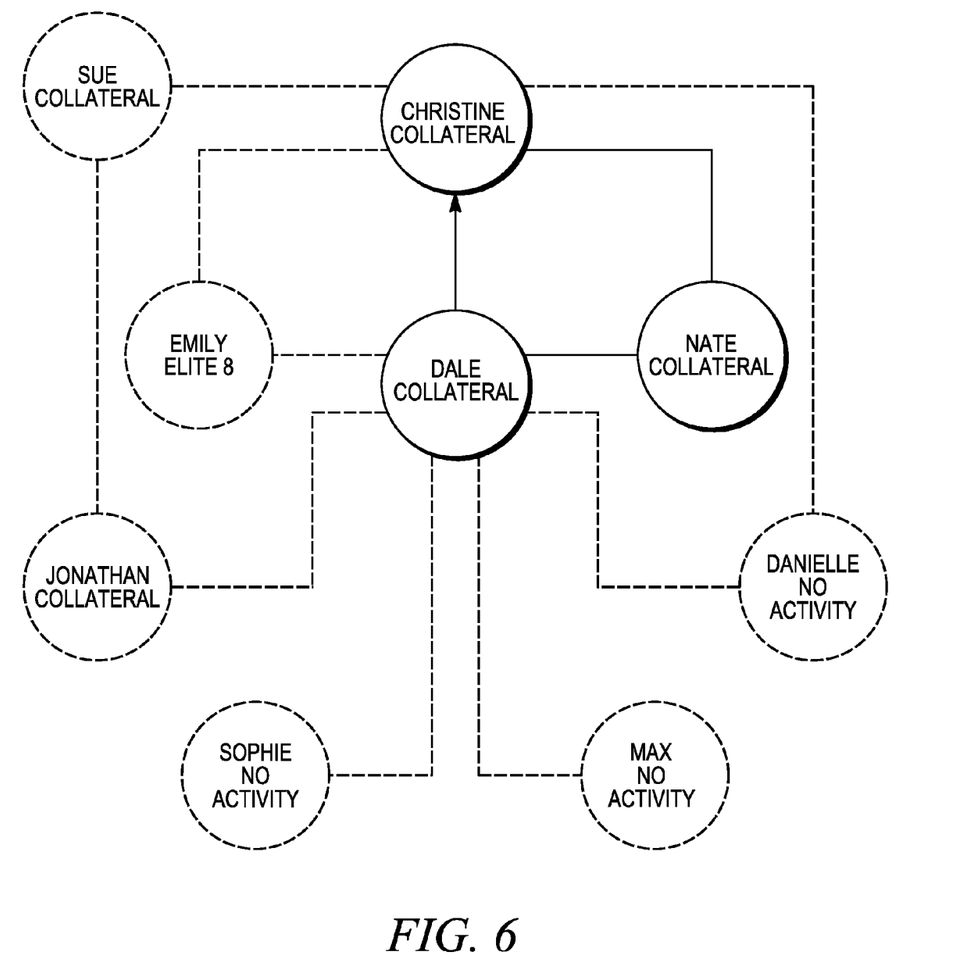
FIG. 6 illustrates a group of social contacts within a superset.

In some embodiments, the controller is configured to form the group of contacts based on a degree of social separation between the contacts in the group before the group is formed. In some embodiments, generally, a degree of social separation of the contacts is also an attribute. In FIG. 5, for example, if the degree of social separation is not more than 2, then Sue could be added to the group of contacts generated by Dale since Sue is within two degrees of separation from Dale via Jonathan or Christine. An alternative interpretation or requirement is that all contact be within 2 degrees of one another. According to this alternative interpretation, Sue, Dale, Jonathan, Nate and Christine are within 2 degrees of separation of each other and thus Sue, Dale, Jonathan, Nate and Christine all form part of the group. In an implementation where the degree of social separation among all contacts in the group is not more than 1, only Dale, Christine and Nate satisfy the requirement as illustrated in FIG. 6.

In another particular implementation, the group of contacts is generated based on an activity performed by the group and based on the running of a particular application. The group of contacts could be formed upon the initiation of an application, for example, the running of a push-to-talk (PTT) or instant messaging (IM) application, in which all members of the group are viewing the same movie and running the PTT application. More generally some other event may precipitate the formation of the group. According to this embodiment, the group contacts could discuss a movie in a PTT session while viewing the movie. The particular application run may impose limits on the degree of social separation among contacts. For example, the PTT application may require that all contacts are within not more than 1 degree of social separation. Thus in FIG. 6, for example, when Dale initiates a PTT application, a group of contacts may be formed with Dale, Christine and Nate since all of these contacts are running the PTT application and since all of these contacts are viewing the movie "Collateral".

In another implementation, the controller of the communications terminal is configured to cause the user interface to display a group of contacts that have one or more attributes in common wherein at least one attribute is a social relationship having at least two degrees of social separation relative to a user associated with the group of contacts. Thus in FIG. 3, the terminal associated with Dale may generate a group of users based on the viewing of the movie "Collateral" wherein each contact must be within 2 degrees of social separation from Dale. This could include any contact within 1 degree of social separation from Christine (e.g., Sue), Nate, or Jonathan. According to this embodiment, Dale is the reference from which the social separation is measured, wherein the social separation of other members is not relevant.

Thus, generally, a communication terminal may provide contextual information about what activity a user's contacts or friends are currently engaged, wherein the user can select and engage in the same activity and create a dynamic communications link with similarly engaged users or contacts.

Over time users will develop new primary social interactions as older socials entities will transition to a lower visibility from day to day communications. Some examples of this phenomenon would include a person graduating from college and starting a new job in a new geographical location. Although, the person may have interactions with college classmates, the user will communicate more frequently with newer social contacts. In this instance, the dynamic networks in this disclosure would change to account for users that are no longer part of the individual's immediate social network and would not be included in the selective dynamic group.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A communications terminal, comprising:
    a user interface;
    a processor communicably coupled to the user interface;
    a memory coupled to the processor and storing instructions that, when executed by the processor, cause the processor to:
    form a group of contacts;
    responsive to receiving attribute information from a computing device, determine a plurality of attributes of each contact of the group of contacts;
    determine, from the group of contacts and based at least in part on the plurality of attributes of each contact of the group of contacts, a subgroup of contacts having at least two attributes in common, wherein a first attribute of the at least two attributes in common is a social relationship of at least two degrees of separation relative to a user such that each contact of the subgroup shares a contact in common with the user but is not a direct contact of the user, and a second attribute of the at least two attributes in common is viewing a particular website;
    responsive to determining the subgroup, output for display at the user interface, the subgroup, wherein the subgroup is displayed at a dedicated portion of the user interface, the dedicated portion being disposed apart from other portions of the user interface at which other groups of contacts are simultaneously displayed; and
    responsive to dynamically determining, based on an action performed by a first contact of the group of contacts, that the first contact no longer has the at least two attributes common to all other contacts in the subgroup, remove the first contact from the subgroup.

2. The terminal of claim 1, further storing instructions that, when executed by the processor, cause the system to:
    responsive to dynamically determining, based on an action performed by a second contact of the group of contacts, that the second contact has the at least two attributes common to all contacts in the subgroup, add the second contact to the subgroup.

3. The terminal of claim 1, further storing instructions that, when executed by the processor, cause the system to:
    form the group of contacts based on a degree of social separation between the contacts in the group before the group is formed.

4. The terminal of claim 1 further comprising a transceiver communicably coupled to the processor.

5. A communication terminal, comprising:
    a user interface;
    a processor communicably coupled to the user interface;
    a memory coupled to the processor and storing instructions that, when executed by the processor, cause the processor to:
    form a first group of contacts, the first group of contacts comprising contacts that are associated with a user;
    determine, based on the first group of contacts, a second group of contacts having at least two attributes in common, wherein a first attribute is a social relationship having at least two degrees of social separation relative to the user such that each contact of the second group of contacts is a direct contact of at least one contact of the first group of contacts associated with the user but is not a direct contact of the user, and a second attribute is an activity being performed or a communicated interested in a particular topic;

responsive to determining the second group, output for display at the user interface, the second group, wherein the second group is displayed at a dedicated portion of the user interface and provides one or more communication links that allow the user to dynamically communicate with contacts of the second group, the dedicated portion being disposed apart from other portions of the user interface at which other groups of contacts are simultaneously displayed; and responsive to dynamically determining, based on an action performed by a first contact, whether the first contact has the at least two attributes in common required to become a member of the second group of contacts, add or remove the first contact from the second group of contacts.

6. The terminal of claim 5, wherein the activity being performed is viewing a particular website.

7. The terminal of claim 5, wherein the activity being performed is executing a particular application.

8. The terminal of claim 5 wherein the activity being performed is playing a particular game.

9. The terminal of claim 5, further comprising a transceiver communicably coupled to the processor.

\* \* \* \* \*